United States Patent
Kasboske (10) Patent No.: US 8,296,921 B2
(45) Date of Patent: Oct. 30, 2012

(54) METHOD OF INSULATING A SPACE

(76) Inventor: George Kasboske, Hickory Hills, IL (US)

( * ) Notice: Subject to any disclaimer, the term of this patent is extended or adjusted under 35 U.S.C. 154(b) by 1036 days.

(21) Appl. No.: 12/231,399

(22) Filed: Sep. 2, 2008

(65) Prior Publication Data

US 2010/0050562 A1    Mar. 4, 2010

(51) Int. Cl.
*B23P 11/00* (2006.01)
(52) U.S. Cl. .......... 29/428; 29/458; 29/527.1; 29/527.2; 52/407.1
(58) Field of Classification Search .............. 29/458, 29/527.1, 527.2, 428; 52/404.1
See application file for complete search history.

(56) References Cited

U.S. PATENT DOCUMENTS
4,417,428 A * 11/1983 Wilkinson ............ 52/172

OTHER PUBLICATIONS

Washington State University-Extension Energy Program—Product & Technology Review—Ultra Concrete Barrier r Foil—May 2007( http://www.energyideas.org/documents/Factsheet/PTR/UltraCBF_rfoil.pdf).*

* cited by examiner

*Primary Examiner* — Derris Banks
*Assistant Examiner* — Azm Parvez
(74) *Attorney, Agent, or Firm* — Wood, Phillips, Katz, Clark & Mortimer (57) ABSTRACT

A method of insulating a space including the steps of: forming an insulation piece using at least one base material that are interlocked so as to produce a body with a predetermined starting shape; and placing the insulation piece in a space to define an insulating barrier between first and second regions between which the space resides.

9 Claims, 4 Drawing Sheets

METHOD OF INSULATING A SPACE

BACKGROUND OF THE INVENTION

1. Field of the Invention

This invention relates to insulation and, more particularly, to a method of insulating a space utilizing an insulation piece with gas retaining capsules.

2. Background Art

With increasing energy costs, the need for better insulation products has become even more pronounced. Those in the construction industry are particularly conscious of governmental and consumer demand for energy efficient homes and businesses. While one focus in this regard is on efficiently seasonally changing the temperature of air within homes and businesses, a more significant impact is made by controlling heat transfer between the occupied spaces and the external environment.

The insulation industry continues to seek out better insulation products and techniques. In spite of its maturity, the industry continues to use predominantly the same products that have been used for decades.

The most commonly used product is that which is made from fiberglass material. Typically, the fiberglass products will be made in predetermined widths and thicknesses corresponding to conventional stud, floor joist and ceiling joist spacing and thickness. This product is made in forms both with and without backing material and supplied in roll form or pre-cut lengths. The backing material facilitates securing of the product to studs and floor and ceiling joists. The unbacked product is frictionally held in place. While this product has been a mainstay in the construction industry, it has a number of inherent drawbacks.

First of all, the product is made with fibrous material that separates and becomes airborne as the product is manipulated. If suitable precautions are not taken by installers, small fibers may find their way into the eyes and lungs of those in the vicinity of where the product is being installed. These small fibers can be highly irritating to the eyes and also represent a health risk when inhaled into the lungs.

Consequently, installers of this type of product are encouraged to wear both protective eyewear and respiratory masks to avoid these conditions. In spite of precautionary warnings, many individuals will not use, or do not have on hand, the requisite equipment to safely handle these products. The need to use protective eyewear and respiratory equipment in any event is an inconvenience to the installer. Available eyewear is commonly made with a relatively inexpensive plastic construction whereby a user's vision may be slightly impaired. This condition may be aggravated as the eyewear becomes contaminated with materials, typically on construction sites, in addition to the fiberglass material.

These small fibers are also irritating to the skin wherever they come in contact therewith. It is impractical for installers to wear full body protection to avoid such contact and thus this condition has been an accepted problem with the installation of conventional fiberglass insulation products. These fibers also tend to migrate into clothing and may follow the wearer into vehicles and elsewhere that the wearer travels.

Additionally, with fiberglass insulation, a vapor barrier is required to avoid generation of condensation within the walls due to a temperature differential between the internal and external environments. The application of the vapor barrier represents an additional expense and inconvenience.

In the event that the fiberglass material does become wet, for whatever reason, be it a leak or condensation, the material may have to be removed and replaced, particularly to avoid mold generation. This may involve the tearing down of plaster or dry wall material to access the insulation material and effect its removal and replacement.

Additionally, fiberglass material is attractive to rodents. Mice tend to nest in this material. Alternatively, rodents may remove the material to create nests at other locations. Thus, the attraction of rodents to the fiberglass material may encourage a rodent problem that exists both with the rodents living in the walls and after they expire.

It is also known to use styrofoam insulating materials, alone or in conjunction with the above-mentioned fiberglass materials. Styrofoam material is relatively difficult to both handle and install. Cutting of the product on site is relatively time consuming and requires a certain degree of skill to avoid insulation gaps. In some situations it may be necessary to use a caulking material to fill gaps between the insulation and: a) studs; b) rafters; and/or joists.

Styrofoam material tends to deteriorate over time. Styrofoam material is also prone to being infested with pests, such as ants and rodents.

Styrofoam is less absorptive than the aforementioned fiberglass products, but nonetheless does have a tendency to admit and retain water. This condition can be alleviated to a certain extent by treating the styrofoam with coatings or other chemicals. However, this process is expensive and is not fully effective when the materials need to be reconfigured on site. That is, a fully encapsulated piece, upon being cut, has exposed regions that may be compromised by moisture, chemicals, or the like.

It is also known to inject flowable foam material into insulation spaces. This is a relatively expensive process that requires a good deal of skill and expensive equipment that must be purchased or rented.

It is also known to inject particulate insulation material into spaces. This material likewise requires specialized equipment on site and a good deal of skill on the part of the installer. This particulate is also relatively difficult to control and confine to the desired space. Also, the material tends to shift and may compact under its own weight and/or be detrimentally repositioned by air circulating through a space. Still further, this type of insulation tends to absorb moisture which may, like other products discussed above, generate mold if not dried in a timely manner. To alleviate this condition, walls may have to be partially torn out to allow removal of the compromised material and effect reinstallation.

The particulate material suffers from the same drawbacks as fiberglass material. Notably, aside from the aforementioned moisture retention problems, the material is attractive to insects and rodents. This type of material also requires a vapor barrier.

Another problem is that the chemicals in sprayed insulation materials may remain toxic until the materials have cured.

In spite of all of the above drawbacks, and problems associated with the known installation systems, the building industry has continued to use these materials and techniques and has contended with these problems because there does not exist a viable alternative.

SUMMARY OF THE INVENTION

The invention is directed to a method of insulating a space. The method includes the steps of: forming an insulation piece using at least one base material that is expanded to define gas retaining capsules that are interlocked to produce a body with a predetermined starting shape; and placing the insulation piece in a space to define an insulating barrier between first and second regions between which the space resides.

In one form, the step of forming an insulation piece involves forming an insulation piece that is readily reconfigurable to be set and maintained in different configurations without the application of any appreciable external force to the insulation piece.

In one form, the step of forming an insulation piece involves forming an insulation piece by injecting a gas into a supply of the at least one base material.

In one form, the insulation piece has a thickness and the step of causing the capsules to interlock involves causing the capsules to interlock to produce interlocking capsules in more than one thickness layer.

In one form, the step of forming an insulation piece involves forming an insulation piece from at least one of: a) a plastic base material; and b) a rubber base material.

In one form, the step of forming an insulation piece involves forming an insulation piece with a substantially uniform width and thickness.

In one form, the step of forming an insulation piece involves forming an insulation piece by injecting a gas through discrete gas feed passages into a supply of the at least one base material.

In one form, the step of forming an insulation piece involves forming an insulation piece by causing the capsules to be formed against a backing layer.

The method may further include the step of continuously moving the backing layer as the capsules are formed against the backing layer.

In one form, the step of forming an insulation piece involves providing first and second components, each with a plurality of apertures, and moving at least one of the first and second components relative to the other of the first and second components to thereby controllably: a) align apertures on the first and second components to thereby define the gas feed passages; and b) misalign apertures on the first and second components, thereby to controllably dictate how the capsules are formed.

In one form, the step of providing first and second components involves providing a first component with a cylindrical wall in which the apertures on the first component are formed and moving the first component around a first axis to thereby controllably align and misalign apertures on the first and second components.

In one form, the step of forming an insulation piece further involves providing a third component for delivery of gas from a supply for passage through the apertures on the first component.

In one form, the step of providing a third component involves providing a third component with a plurality of apertures and relative to which the first component moves as the first component moves around the first axis, thereby to controllably: a) align apertures on the first and third components to deliver gas from the supply to the apertures in the first component; and b) misalign apertures on the first and third components, thereby to controllably dictate how the capsules are formed.

In one form, the step of providing first and second components involves providing a second component with apertures: a) through which gas is delivered directly into the at least one base material; and b) that have a substantially circular shape.

In one form, the step of providing first and second components involves providing a second component with apertures: a) through which gas is delivered directly into the at least one base material; and b) that have a substantially non-circular shape to thereby produce capsules of desired shape.

In one form, the step of forming an insulation piece involves forming an insulation piece in a continuous process to thereby produce an elongate web and cutting the web to define the predetermined starting shape.

In one form, the step of forming an insulation piece involves forming an insulation piece in a mold having a shape that as complementary to the predetermined starting shape.

In one form, the step of forming an insulation piece involves forming an insulation piece with a width and thickness that correspond to a width and thickness between one of: a) studs on a wall of a building; b) joists on a floor or ceiling of a building; and c) trusses on a building.

In one form, the step of placing the insulation piece in a space involves placing the insulation piece in a space between one of: a) studs on a wall of a building; b) joists on a floor or ceiling of a building; and c) trusses on a building.

In one form, the step of placing the insulation piece in a space involves attaching the backing layer to one of: a) studs on a wall of a building; b) joists in a floor or ceiling of a building; and c) trusses on a building.

DETAILED DESCRIPTION OF THE PREFERRED EMBODIMENT

Figure 1:
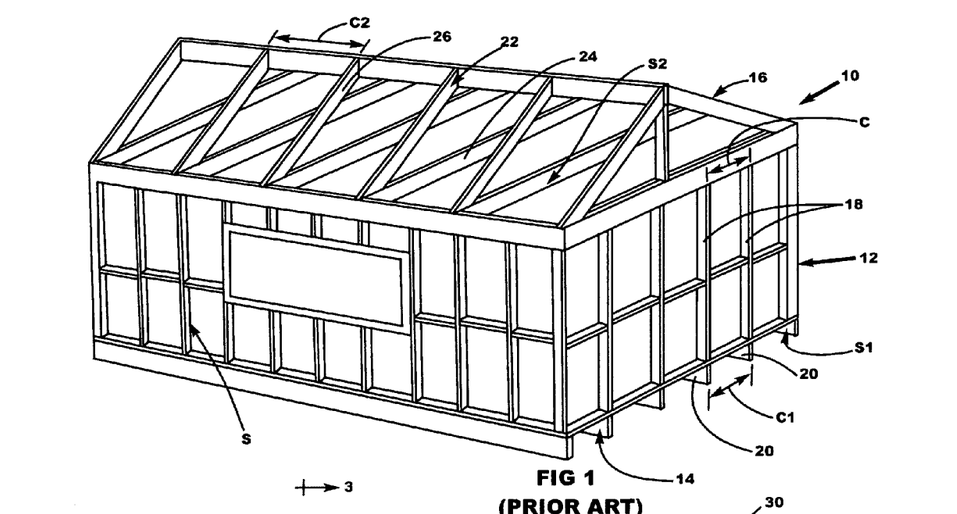
FIG. 1 is a fragmentary, perspective view of a frame for a building defining spaces between structural components within which insulation can be installed, according to the present invention.

In FIG. 1, an exemplary environment for the present invention is shown. In FIG. 1, a frame for a building is shown at 10. The frame 10 has peripheral wall framing at 12, floor framing at 14 and roof framing at 16. The components making up the peripheral wall framing 12, floor framing 14, and roof framing 16 may vary. Commonly, these framing components are made from wood, but they may be made from metal or other materials known to those in the building industry.

The wall framing 12 consists of vertically extending studs 18 with center spacing C typically at 16 inches. With an exemplary, nominal 2 inch stud thickness, the spacing between the studs 18 is 14½ inches. The studs 18 may be made from 2×4, 2×6, 2×10, or other width material.

The floor framing 14 consists of joists 20 that are commonly made from 2 inch stock material with a nominal width of 6 inches, 10 inches, 12 inches, or wider. The floor joists 20 are commonly spaced on centers C1 corresponding to that for the studs 18.

The roof framing 16 consists normally of trusses 22 spaced on centers C2, corresponding to the spacing of the studs 18 and floor joists 20, but shown wider in FIG. 1 for clarity purposes. The trusses 22 define ceiling joists 24 and roof rafters 26.

On the external shell defined by the frame 10, insulation is commonly provided in the spaces S, S1 and S2, respectively between the studs 18, floor joists 20 and trusses 22. Insulation may be provided elsewhere on the frame including at fully internal locations. For purposes of simplicity, the spaces identified herein as S, S1 and S2 are intended to encompass virtually any space between building components within which an insulating material is desirably, and commonly, placed.

According to the invention, an insulation piece 30 is formed as shown initially in FIGS. 2-5. The insulation piece 30 has a main body 32 that substantially fills the space S, S1 and S2. While preferably one piece fills the entire thickness T of the space S, S1, S2 between the studs 18, floor joists 20, and ceiling joists 24, multiple pieces could be combined to cooperatively produce the desired thickness.

In this form, the insulation piece 30 has a backing layer 34 against which the main body 32 is formed. The backing layer 34 has flaps 36, 38 that project laterally oppositely beyond the width W of the main body 32 of the insulation piece 30.

Figure 2:
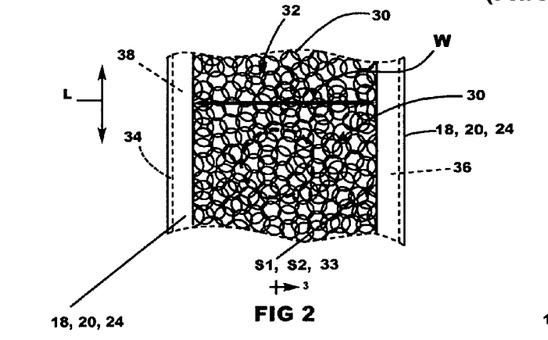
FIG. 2 is a fragmentary, perspective view of two frame components on the building structure in FIG. 1 with an insulation piece, according to the present invention, placed in a space therebetween.
Figure 3:
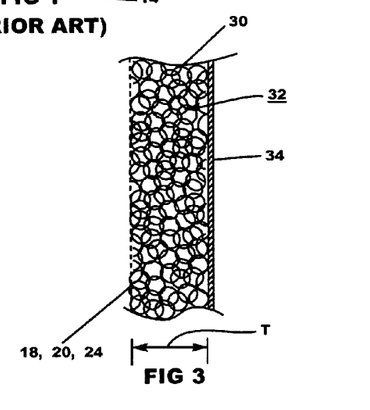
FIG. 3 is a cross-sectional view of the frame components and insulation piece taken along line 3-3 of FIG. 2.

With the insulation piece 30 as shown in FIGS. 2 and 3, the main body 32 can be placed into the space S, S1, S2, whereupon the flaps 36, 38 will bear facially against the studs 18, floor joists 20, or ceiling joists 24. Potentially the flaps 36, 38 can be secured thereto, as by an adhesive, or separate fastener elements, such as staples, nails, etc.

Figure 6:
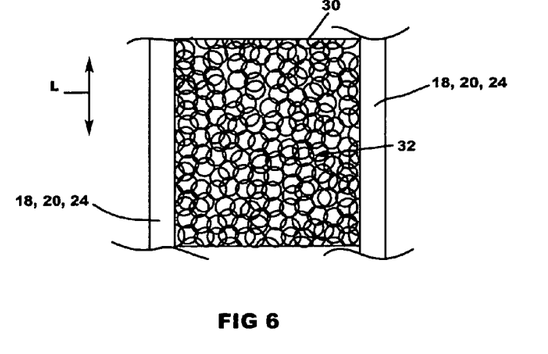
FIG. 6 is a view as in FIG. 2 showing a modified form of insulation piece, according to the present invention.

As an alternative to this construction, as shown in FIG. 6, the backing layer 34 can be omitted, whereupon the main body 32 is frictionally held between adjacent studs 18, floor joists 20, or ceiling joists 24.

To facilitate installation, the main body 32 is preferably made with a substantially uniform width W and thickness T corresponding respectively to the width of the space S, S1, S2, that is standard in the construction industry, and the thicknesses T, common to the studs 18, floor joists 20 and ceiling joists 24.

Figure 4:
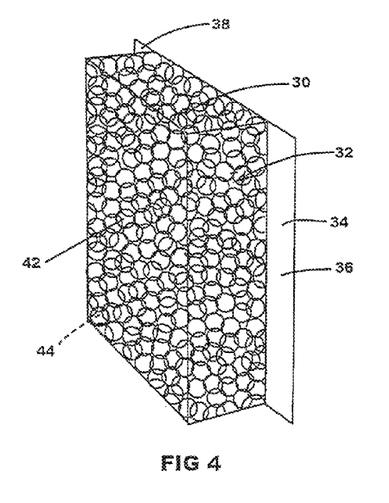
FIG. 4 is a fragmentary, perspective view of the insulation piece in FIGS. 2 and 3.
Figure 7:
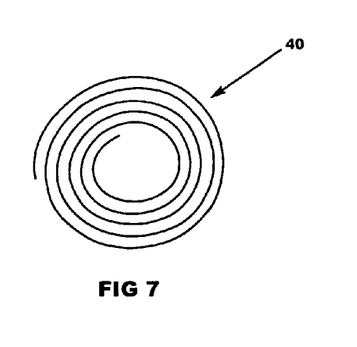
FIG. 7 is a side elevation view of a bulk formed insulation piece, made according to the present invention and placed in a rolled form.

The length of the insulation piece 30, as indicated by the double-headed arrow L in FIGS. 2 and 4, can be fixed, based upon standard building dimensions, i.e., 8 foot stud height, or may be made in a continuous form that may be wrapped into a roll, as shown at 40 in FIG. 7 and cut on site into discrete, desired lengths by an installer.

Figure 5:
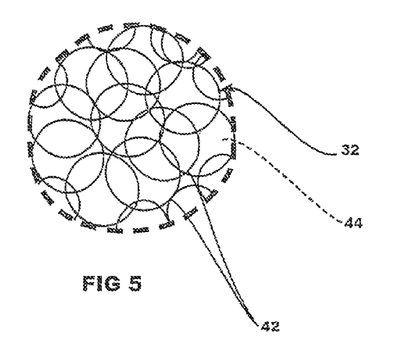
FIG. 5 in an enlarged view of the insulation piece within the dotted circle shown in FIG. 2.

As shown, particularly clearly in FIG. 5, the main body 32 of the insulation piece 30 consists of interlocked capsules 42 that cooperatively define the thickness T, that is preferably greater than the corresponding thickness of any single capsule 42. The capsules 42 are preferably defined by expanding a base material through injection of a gas 44 that becomes retained within the capsules 42.

There is significant leeway contemplated in terms of the selection of the type of base material that defines the capsules 42 and the gas 44 therewithin. For example, the gas 44 may be atmospheric air or some other gas selected for desirable properties.

The base material may be selected for its properties once the insulation piece 30 is formed and for suitability to be processed to produce the insulation piece 30, as described herein. Amongst the other considerations in the selection of the base material are its insulating properties, durability upon being handled, and its ability to retain the gas 44 long term in the capsules 42 without any significant diffusion therethrough or escape as caused by rupture, or the like. Plastic and rubber compositions are preferred for the base materials. Those skilled in the art would be able to make many different variations in the base material, gas 44 and process, as hereinafter described, to produce the most appropriate product for the particular application.

As seen in FIGS. 2-6, the capsules 42 interlock and are stacked in several "tiers" or "layers" in preferably all directions to produce the overall predetermined starting shape for the insulation piece 30. Ideally, the effective diameter of the capsules 42 is significantly less than the corresponding dimension of the occupied space for the main body 32 so that there are multiple capsule layers in each direction, i.e., length, width, thickness, etc. Through this arrangement, there is a network of capsules 42 that gives the main body 32 a certain degree of dimensional rigidity. At the same time, the main body 32 is ideally readily reconfigurable to be set and maintained in different configurations without the application of any appreciable external force to the insulation piece 30. For example, while the main body 32 is shown with a predetermined starting shape matched to the space within which it is placed, the insulation piece 30 can be bulk formed and placed into the form of the roll 40, as described above with respect to FIG. 7, for compact storage and facilitated transportation.

Figure 4A:
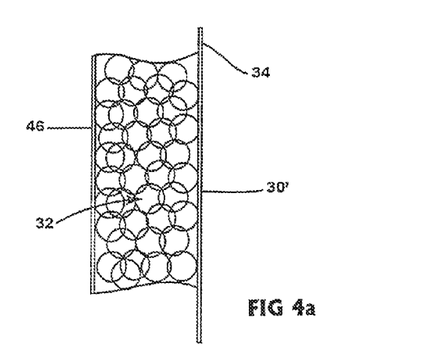
FIG. 4a is a fragmentary, side elevation view of an insulating piece as in FIGS. 2 and 3 with an additional backing layer.
Figure 8:
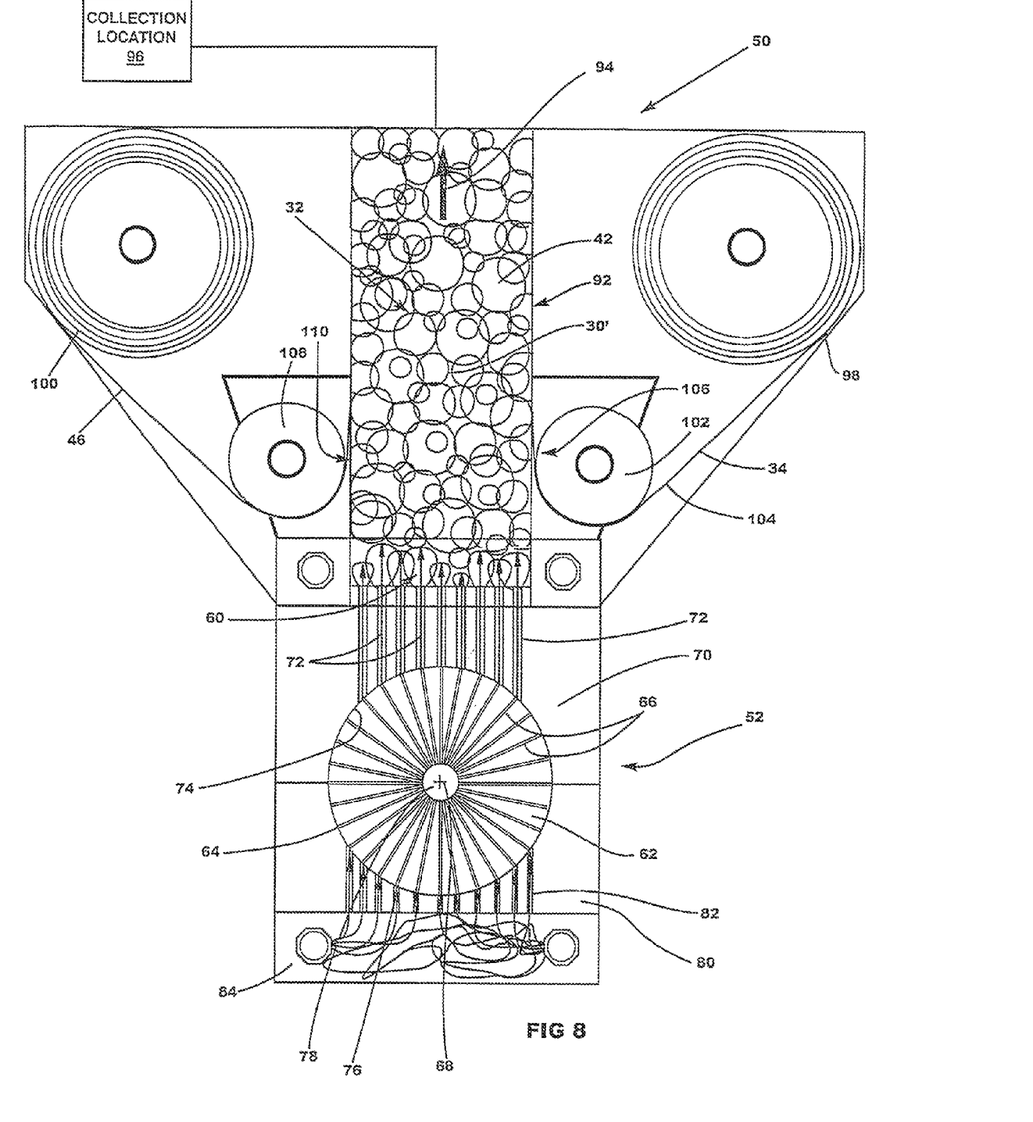
FIG. 8 is a side elevation view of a system/apparatus for making insulation, according to the present invention.

To protect the main body 32, a second backing layer 46 may be provided, as shown in FIGS. 4a and 8. This facilitates the formation of the insulation piece 30', which is in all other respects the same as the insulation piece 30.

The capsules 42 can be made with the same or different sizes and shapes. Ideally, the capsules 42 are configured so that the volume of the space occupied by the main body 32 is in large proportion occupied by captive gas 44 within the capsules 42. The predetermined capsule configuration is dictated by the manner in which the main body 32 is formed. All capsules 42 could have the same discrete shape. During formation, some of the capsules 42 may combine to cooperatively bound a larger volume. Generally, a spherical shape is desirable for the capsules 42 due to the ability of capsules of this shape to nest/interlock. This interlocking can occur with the capsules 42 having the same or different, mixed sizes.

Regardless of the details of construction for the insulation, the capsules 42 should at least: a) have adequate durability to not be compromised during transportation, storage, and installation; b) retain the gas 44 for an adequate product life; and c) be configured to maintain the proper proportion of gas and base material in the volume within which the main body 33 occupies.

The nature of the material defining the capsules 42, the nature of the gas 44, the shape of the capsules 42 and the proportions of: a) the material forming the capsules 42; and b) the gas 44 can be strategically selected by those skilled in the art to achieve desired ends for the system. While maximizing thermal resistance ("R-Value") is often a design objective, there may be other factors that dictate a specific preferred construction.

The shape of the capsules 42 may be varied to select desired rigidity, bending characteristics, etc. Virtually any shape may be selected. Additionally, the shapes may be selected for aesthetic purposes.

In one exemplary form, as described below, the capsules 42 are defined in a manner whereby it is not intended that a precise shape thereof be consistently repeated throughout the main body 32. With this process, the shape is dictated at least nominally by the particular equipment, with it being understood that there may be a significant amount of deviation, potentially in a random manner, from the specific shape for which the system is designed.

Figure 9:
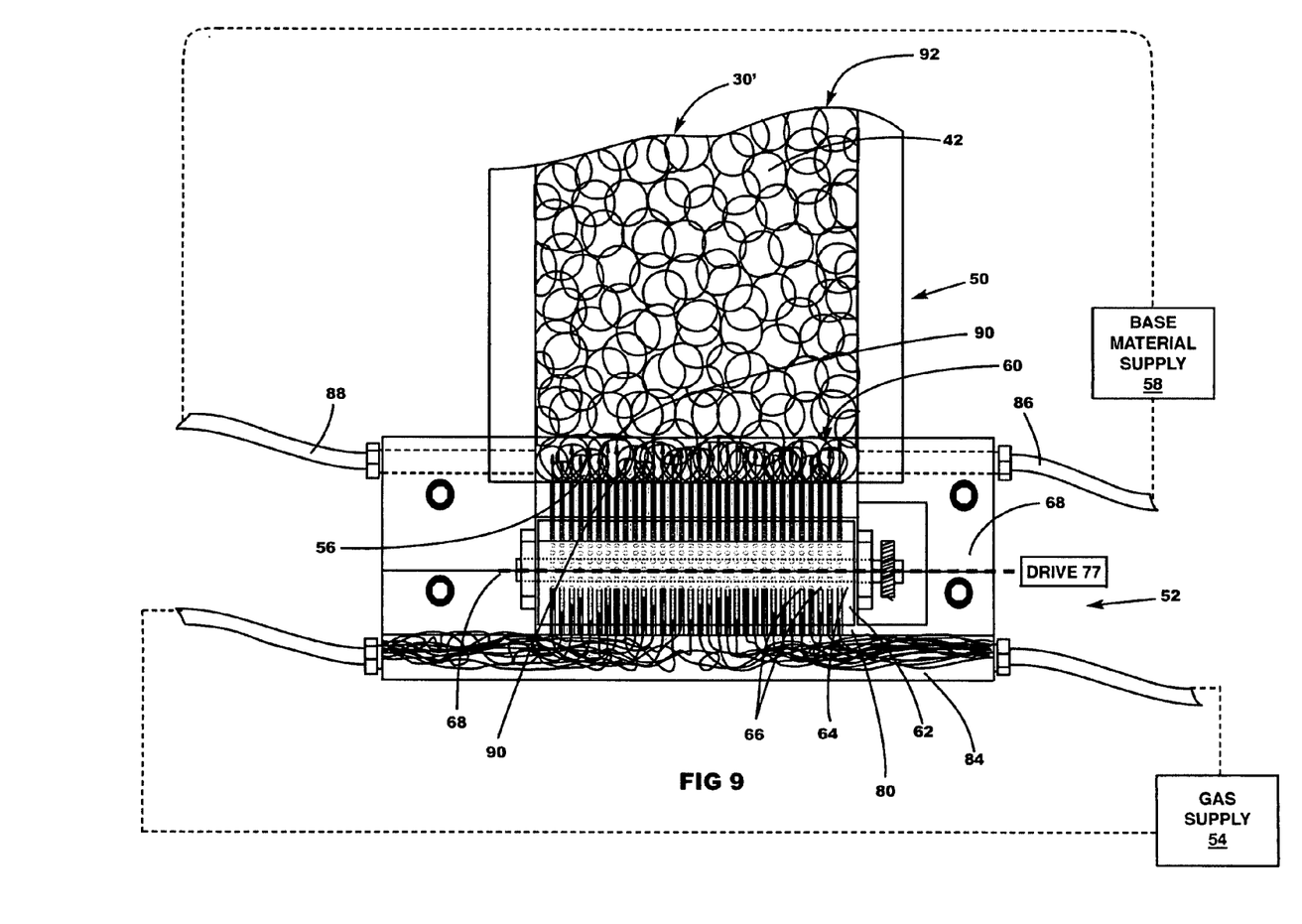
FIG. 9 is a fragmentary, front elevation view of the system/apparatus shown in FIG. 8.

More particularly, one system/apparatus for producing the insulation piece 30,30' is shown in FIGS. 8 and 9 at 50. The system/apparatus 50 consists of a first section 52 through which the gas 42, from a supply 54 thereof, and base material 56, from a supply 58 thereof, are delivered for controlled intermixing at a region at 60.

More particularly, the first section 52 consists of a first component 62 with a cylindrical wall 64 through which a plurality of apertures 66 are formed. The apertures 66 are shown with a generally cylindrical cross-sectional shape. The apertures 66 are spaced at regular intervals both in a circumferential direction and axially with respect to the central axis 68 of the first component 62 and its cylindrical wall 64.

The first section 52 additionally has a second component 70 through which a plurality of apertures 72 are formed. The component 70 has a concave surface 74 against which the outer surface 76 of the cylindrical wall 64 closely seats. The apertures 72 are spaced so that in one angular relationship between the first and second components 60,70, the apertures 72 align, one each, with an aperture 66 in the first component 62 to define a flow passage between the center 78 of the first component 62 and the mixing region 60.

The apertures 66 are adequately spaced circumferentially so that by angularly changing the position of the first component 62 relative to the second component 70 around the axis 68, by operation of a drive 79, the apertures 66,72 became misaligned. In this latter state, gas flow from the center 78 through the apertures 66 and to the mixing region 60 is blocked. While the depicted embodiment shows all apertures 66,72 either fully aligned or misaligned, the invention contemplates that there may be a partial misalignment of these apertures 66,72. Alternatively, different delivery arrangements can be devised by having different types of registration between the aperture 66, 72, due to their location or their relative sizes and shapes.

The section 52 additionally includes a third component 80 with apertures 82 that are arranged to register with the apertures 66 with the apertures 66, 72 in registration. The apertures 82 are in communication with the gas supply 54 through a manifold 84. With the apertures 66, 72, 82 in registration, flow passages are defined continuously from the gas supply 54 into the center 78 of the first component 62 and through the components 62, 70, 80 to the mixing region 60. By turning the first component 62 around its axis 68 continuously, the apertures 66 on the first component are repeatedly aligned and misaligned with the apertures 72,82 on the second and third components 70, 80 respectively. Through this arrangement, the delivery of the pressurized gas 44 from the supply 54 thereof can be controlled to dictate the particular formation of the capsules 42.

Separate delivery conduits 86, 88 direct base material from the supply 58 oppositely into the mixing region 60 whereat discharging gas 44 from the apertures 72 is injected into the base material that, in the particular configuration, flows upwardly, as indicated by the arrows 90. The base material is heated to be in flowable form. The injected gas 44 expands the base material in an upward and outward direction and causes the formation of the discrete capsules 42 as the base material expands into a discrete, closed configuration. The delivery through the multiple apertures 72 causes the interlocking capsule formation over the full width W and thickness T of the main body 32.

The system/apparatus 50 is one designed for continuous formation of an insulation piece. More particularly, a continuous web 92 of, in this case, the insulation piece 30', is formed and advanced in the direction of the arrow 94 from where the completed product may be staged at a collection location 96. At this location, or elsewhere, the web 92 may be either rolled or cut to a desired working length.

In this embodiment, there are separate supplies 98,100 of the backing layers 34, 46. A guide roller 102 advances and redirects the backing layer 34 to place a side 104 thereof against the main body 32 at a location at 106 where it departs from the mixing region 60. A similar guide roll 108 is provided to facilitate placement of the backing layer 46 against the opposite side of the main body 32 at a location 110.

As noted, the base material is preferably in a heated state to facilitate flow into the mixing region 60. Once the gas 44 is injected, the main body 32 flows upwardly and maintains sufficient tackiness that it adheres to both backing layers 34,46. As also noted previously, the backing layer 46 may be omitted from the product to produce the insulation piece 30.

For purposes of uniform flow and pressure maintenance, the gas supply 54 and base material supply 58 cause delivery of gas and base material in opposite directions respectively into the manifold 84 and the mixing region 60. The supplies 54, 58 may be split for this purpose or separate supplies (not shown) may be provided to maintain ideal delivery conditions.

Figure 10:
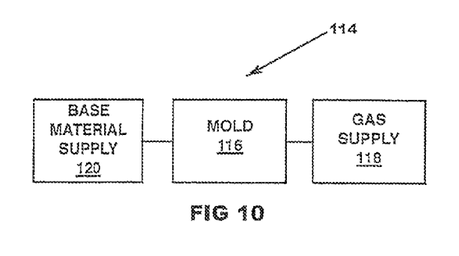
FIG. 10 is a schematic representation of an alternative form of apparatus/system for making insulation, according to the present invention.

As an alternative to the continuous formation of a web, as shown in FIG. 10, the invention also contemplates that an apparatus/system as shown at 114 in FIG. 10 may incorporate a mold 116 for producing an insulation piece of a particular size. Using the inventive concept, gas and base material may be delivered into the mold 116 from separate supplies 118, 120 thereof. Utilizing the inventive concepts, the gas can be injected into the base material to produce the desired capsule configuration.

Figure 11:
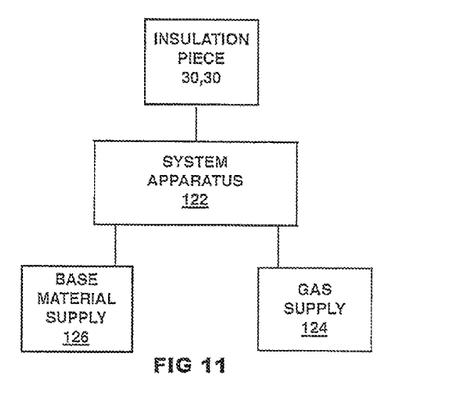
FIG. 11 is a schematic and generic representation of an apparatus/system for making insulation, according to the present invention.

It should be understood that the system/apparatus 50 is only exemplary in nature as other systems/apparatus could be devised to produce the insulation pieces 30, 30' consistent with the inventive concepts. In FIG. 11, a system/apparatus 122 is shown in generic form that is intended to encompass all systems/apparatus that might be utilized as an alternative to the construction shown specifically for the system/apparatus 50, to inject gas, from a supply 124, into a base material, from a supply 126, to produce an insulation piece 30, 30'.

Figures 12, 13:
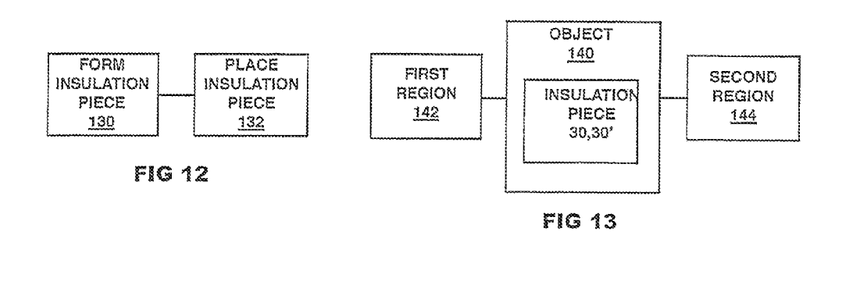
FIG. 12 is a flow diagram representation of a method of insulating a space, according to the present invention.
FIG. 13 is a schematic representation of an object with an insulation piece, according to the present invention, in a space therewithin and defining an insulating barrier between separate regions.

Regardless of the precise system/apparatus that is used to form the insulation piece 30, 30', the invention contemplates a method as set forth in flow diagram form in FIG. 12. More specifically, as shown in block 130, the invention contemplates forming an insulation piece having at least one base material that is expanded to define gas retaining capsules. The capsules interlock so as to produce a body with a predetermined starting shape. As shown at block 132, the insulation piece is placed in a space to define an insulating barrier between first and second regions between which the space resides.

The inventive concept is shown generically in FIG. 13 with the insulation piece 30, 30' provided in a space on an object 140 to define an insulating barrier between first and second regions 142, 144, respectively. The object 140 can be virtually any object in which a preformed insulation piece can be installed. The building frame 10 is but one exemplary object. For example, the object 140 might be a part of a chassis of an automobile, an external wall on a trailer, etc.

The insulation pieces 30, 30' may become structural components that can be used in the construction of a portable building. For example, the insulation pieces 30, 30' may define walls of a greenhouse-type building. Rigid plastic (i.e. 4×8 sheets) might be formed into flat panels to assist in this process.

The insulation pieces 30, 30' can also be used as a layer or layers over existing fiberglass and other forms of insulation to create an additional heating/cooling barrier. Predetermined widths of insulation strips can be attached to each other to make larger sections. The flaps 36, 38 that are used to affix the insulation to a vertical or angled surface can be used to secure together abutted insulation pieces 30, 30'. The insulation pieces 30, 30' can overlay existing insulation, thereby mitigating many existing insulation problems that are apparent in current systems.

The invention also contemplates many variations from the specific component configuration and system described above.

As just one example, the second and third components 70, 80 may be defined as one piece. The two-piece construction is shown as a manufacturing/assembly expedient.

The foregoing disclosure of specific embodiments is intended to be illustrative of the broad concepts comprehended by the invention.

The invention claimed is:

1. A method of insulating a space, the method comprising the steps of:
    forming an insulation piece comprising at least one base material that is expanded by injecting a gas into a supply of the at least one base material to thereby define gas retaining capsules,
    the forming step further comprising the step of causing the capsules to interlock as an incident of the base material expanding to form the gas retaining capsules so as to produce a body with a predetermined starting shape; and
    placing the insulation piece in a space to define an insulating barrier between first and second regions between which the space resides,
    wherein the insulation piece has a thickness and the step of causing the capsules to interlock comprises causing the capsules to interlock to produce interlocking capsules in more than one thickness layer.

2. A method of insulating a space, the method comprising the steps of:
    forming an insulation piece comprising at least one base material that is expanded by injecting a gas into a supply of the at least one base material to thereby define gas retaining capsules,
    the forming step further comprising the step of causing the capsules to interlock as an incident of the base material expanding to form the gas retaining capsules so as to produce a body with a predetermined starting shape; and
    placing the insulation piece in a space to define an insulating barrier between first and second regions between which the space resides,
    wherein the step of forming an insulation piece comprises forming an insulation piece by causing the capsules to be formed against a backing layer,
    the method further comprising the step of continuously moving the backing layer as the capsules are formed against the backing layer.

3. A method of insulating a space, the method comprising the steps of:
    forming an insulation piece comprising at least one base material that is expanded to define gas retaining capsules,
    the forming step further comprising the step of causing the capsules to interlock so as to produce a body with a predetermined starting shape; and
    placing the insulation piece in a space to define an insulating barrier between first and second regions between which the space resides,
    wherein the step of forming an insulating piece comprises forming an insulation piece by injecting a gas through discrete gas feed passages into a supply of the at least one base material,
    wherein the step of forming an insulation piece comprises providing first and second components each with a plurality of apertures and moving at least one of the first and second components relative to the other of the first and second components to thereby controllably: a) align apertures on the first and second components to thereby define the gas feed passages; and b) misalign apertures on the first and second components, thereby to controllably dictate how the capsules are formed.

4. The method of insulating a space according to claim 3 wherein the step of providing first and second components comprises providing a first component with a cylindrical wall in which the apertures on the first component are formed and moving the first component around a first axis to thereby controllably align and misalign apertures on the first and second components.

5. The method of insulating a space according to claim 4 wherein the step of forming an insulation piece further comprises providing a third component for delivery of gas from a supply for passage through the apertures on the first component.

6. The method of insulating a space according to claim 4 wherein the step of providing a third component comprises providing a third component with a plurality of apertures and relative to which the first component moves as the first component moves around the first axis, thereby to controllably: a) align apertures on the first and third components to deliver gas from the supply to the apertures in the first component; and b) misalign apertures on the first and third components, thereby to controllably dictate how the capsules are formed.

7. The method of insulating a space according to claim 3 wherein the steps of providing first and second components comprises providing a second component with apertures: a) through which gas is delivered directly into the at least one base material; and b) that have a substantially circular shape.

8. The method of insulating a space according to claim 3 wherein the step of providing first and second components comprises providing a second component with apertures: a) through which gas is delivered directly into the at least one base material; and b) that have a substantially non-circular shape to thereby produce capsules of desired shape.

9. A method of insulating a space, the method comprising the steps of:
    forming an insulation piece comprising at least one base material that is expanded by injecting a gas into a supply of the at least one base material to thereby define gas retaining capsules,
    the forming step further comprising the step of causing the capsules to interlock as an incident of the base material expanding to form the gas retaining capsules so as to produce a body with a predetermined starting shape; and placing the insulation piece in a space to define an insulating barrier between first and second regions between which the space resides, wherein the step of forming an insulation piece comprises forming an insulation piece in a mold having a shape that as complementary to the predetermined starting shape.

* * * * *